(12) United States Patent
Sato

(10) Patent No.: US 7,142,587 B2
(45) Date of Patent: Nov. 28, 2006

(54) RECEIVED PATH TIMING DETECTING CIRCUIT AT DS-CDMA SYSTEM

(75) Inventor: Toshifumi Sato, Tokyo (JP)

(73) Assignee: NEC Corporation, Tokyo (JP)

( * ) Notice: Subject to any disclaimer, the term of this patent is extended or adjusted under 35 U.S.C. 154(b) by 890 days.

(21) Appl. No.: 09/875,151

(22) Filed: Jun. 7, 2001

(65) Prior Publication Data

US 2001/0050950 A1    Dec. 13, 2001

(30) Foreign Application Priority Data

Jun. 9, 2000    (JP)    ............................. 2000-173580

(51) Int. Cl.
  *H04B 1/707* (2006.01)
(52) U.S. Cl. .................................... 375/150; 375/343
(58) Field of Classification Search ................ 375/130, 375/140, 147, 150, 152, 142, 143, 316, 340, 375/343
  See application file for complete search history.

(56) References Cited

U.S. PATENT DOCUMENTS

| | | | | |
|---|---|---|---|---|
| 5,060,515 A | * | 10/1991 | Kanda et al. | ................. 73/602 |
| 6,490,010 B1 | * | 12/2002 | Shibuya et al. | ............. 348/735 |
| 2001/0005176 A1 | * | 6/2001 | Hofmann | ..................... 341/155 |
| 2003/0031195 A1 | * | 2/2003 | Okawa et al. | ............... 370/441 |

FOREIGN PATENT DOCUMENTS

| | | |
|---|---|---|
| JP | 8-181634 A | 7/1996 |
| JP | 10-32523 A | 2/1998 |
| JP | 2751959 | 2/1998 |
| JP | 10-256942 A | 9/1998 |
| JP | 11-8568 A | 1/1999 |
| JP | 11-17652 A | 1/1999 |
| JP | 2911117 B1 | 4/1999 |
| JP | 2000-78110 A | 3/2000 |
| JP | 2000-269860 A | 9/2000 |
| JP | 2001-168767 A | 6/2001 |
| WO | WO9914914 A2 * | 3/1999 |
| WO | WO 99/59254 A2 | 11/1999 |
| WO | WO0001099 A * | 1/2000 |
| WO | WO 00/36761 A2 | 6/2000 |

OTHER PUBLICATIONS

A. Viterbi, "Principles of Spread Spectrum Communication", Addison-Wesley Wireless Communication Series, Apr. 1995, pp. 52-67.
3rd Generation Partnership Project; Technical Specification Group Radio Access Network; "Spreading and Modulation", 3G TS 25.213 Version 3.1.1, (Dec. 1999), pp. 1-27.

* cited by examiner

*Primary Examiner*—Kevin Burd
(74) *Attorney, Agent, or Firm*—Sughrue Mion, PLLC

(57) ABSTRACT

A received path timing detecting circuit in a receiver used in a DS-CDMA system, which can detect received path timing in multi path propagation channels even under surroundings in which noise and interference electric power are very large, is provided. A received path timing detecting circuit calculates cross correlation coefficients $\{R_{N,M}\}$ between a received signal and a reference signal in a predetermined cycle, a differential detector obtains real parts of products of complex conjugate numbers of respective elements of the cross correlation coefficients $\{R_{N-1,M}\}$ calculated at the N−1st cycle (N is an integer) and respective elements of the cross correlation coefficients $\{R_{N,M}\}$ calculated at the Nth cycle, and outputs the real parts as differential detection cross correlation coefficients $\{P_{N,M}\}$, an averager for averaging the differential detection cross correlation coefficients outputted from the differential detector by a predetermined time, and a peak detector that detects one or plural peak values from the averaged cross correlation coefficients $\{PA_{N,M}\}$ and outputs the detected one or plural peak values as the received path timing.

4 Claims, 3 Drawing Sheets

US 7,142,587 B2

RECEIVED PATH TIMING DETECTING CIRCUIT AT DS-CDMA SYSTEM

BACKGROUND OF THE INVENTION

The present invention relates to a received path timing detecting circuit at a receiver in a base station in a cellular system using for mobile phones and cellular phones, in the direct spread—code division multiple access (DS-CDMA) system.

DESCRIPTION OF THE RELATED ART

Existing technologies relating to the present invention are the cdmaOne (TIA/EIA IS95) system and the wideband—code division multiple access (W-CDMA) system that has not been realized yet but has been under study to be standardized at the third generation partnership project (3GPP).

At the cdmaOne system, as a spreading code for a downlink being from a base station to a mobile terminal, a spreading code, which a PN code being relatively long having 26.6 ms cycle (=80 ms/3, 32768 chips) is multiplied by a Walsh code having 64 code length, is used. As the PN code, a different code every base station and every antenna even in the same base station is used, in this, to be exact, the different code signifies that the same spreading code is shifted to a certain number of times. The Walsh code having 64 code length is used to distinguish a channel from plural channels transmitting from a sector, because at the CDMA system, one carrier is used commonly at the plural channels and the channel is distinguished by its spreading code.

A pilot channel whose data are not modulated is transmitted by a relatively strong electric power every sector, and the Walsh code using at the pilot channel is number "0", that is, "0" code is used for all the Walsh codes. That is, signals transmitting by the pilot channel are predetermined code series of 26.6 ms cycle. Therefore, the mobile terminal at the cdmaOne system uses the pilot channel, and detects the received path timing by detecting a peak of the cross correlation coefficients between the code series of the predetermined pilot channel and a received signal.

The cycle of the spreading code is 32768 chips, therefore it is too long to obtain all of the cross correlation coefficients at the same time. Therefore, the cross correlation coefficients are obtained in order by that a sliding correlator makes the time of the received signal and the time of a reference signal (spreading code of predetermined pilot channel) shift.

For example, a conventional received path timing detecting method (chip synchronization) is described in Principles of Spread Spectrum Communication, April 1995, written by Andrew J. Viterbi. In this method, the timing of signal spread by a spreading code being a pseudo random code is searched by two steps. That is, the two steps are an initial path search and a path tracking.

The initial path search is described in the section 3.4 in the literature mentioned above, and the received path timing is serially searched by that the received path timing is serially shifted by ½ chip interval until the correlation electric power exceeds a threshold value. The path tracking method is called as an early-late gate method or a delay locked loop (DLL) method. And at the methods, the correlation electric power at the timing being earlier by $\Delta t$ than the delay time to be received and the correlation electric power at the timing being later by $\Delta t$ than the delay time to be received are obtained. And the timing is adjusted finely so that the difference between them is made to be "0".

After the received path timing was detected once, it is enough that the path tracking can be executed for a change of propagating time between the base station and the mobile terminal caused by that the mobile terminal moves and a change of propagating time caused by the positions relating with reflecting objects in the multi-path propagation channels. Therefore, it is enough that the cross correlation coefficients (showing a delay profile in propagation channels) are obtained in a range of a few micro seconds to a few 10 micro seconds before and after for the current timing.

At the W-CDMA system, a Gold code of 10 ms cycle and a Walsh code of 1 symbol cycle (the code length is different among symbol rates) are used as a spreading code. At the downlink (base station to mobile terminal), a different Gold code is used for each base station and each of plural sectors in the same base station. At the uplink (mobile terminal to base station), a different Gold code is used for each mobile terminal, and a different Walsh code is allocated to each of different physical channels in the same mobile terminal. Both at the uplink and the downlink, pilot symbols modulated by predetermined code series are multiplexed (code division multiplexed and time division multiplexed).

This technology is described in the 3rd Generation Partnership Project; Technical Specification Group Radio Access Network; Spreading and modulation (FDD) (3G TS 25.213 version 3.1.0).

The pilot symbols at the W-CDMA system are not entirely spread by the same spreading code (including shift) at all of the base stations or mobile terminals, being different from the downlink at the IS 95 system. However, when this spreading code is known, the code series of the pilot symbols can be regarded to be the known code series completely. Therefore, at the W-CDMA system, the received path timing can be detected by detecting the peak value of the cross correlation coefficients between the code series of the predetermined pilot symbol and a received signal by using this pilot symbol.

At the W-CDMA system, the chip rate is faster than at the IS 95 system, therefore, when the multi path channels change, a case, in which the received path timing changes discontinuously for over 1 chip (since the 1 chip is 260 ns, this corresponds to a propagation channel difference of about 78 m), occurs frequently. Therefore, it is impossible to realize a sufficient path tracking by using the DLL using at the IS 95 system.

As a conventional received path timing detecting method at the W-CDMA system, Japanese Patent No. 2751959 describes a received path timing detecting circuit at a CDMA receiver. The received path timing detecting circuit at the CDMA receiver provides a series correlator that obtains the cross correlation between a received signal and known signal series for a predetermined period every a constant cycle and outputs cross correlation coefficients signifying the obtained cross correlation, an interpolation filter that applies again sampling at a higher frequency than the sampling frequency of the cross correlation coefficients to the cross correlation coefficients and outputs the cross correlation coefficients applied the sampling at the higher frequency, an electric power calculating means that calculates the electric power of the cross correlation coefficients applied the sampling at the higher frequency and outputs the calculated electric power of the cross correlation coefficients, an averaging means that averages the calculated electric power of the cross correlation coefficients in plural cycles and outputs the averaged electric power of the cross correlation coefficients, and a peak detecting means that detects the peak value of the averaged electric power of the cross correlation coefficients and decides that the received path timing of the CDMA receiver is the timing at the time when the peak value is detected.

However, at the conventional CDMA system, when average electric power of the cross correlation coefficients is calculated, the average electric power is calculated by adding electric power of noise and an interference wave to a signal to be received (desiring wave). Therefore, there is a problem that it is difficult to detect a real peak (receiving timing of the desiring wave), when the electric power of the noise and the interference wave is large. In order to solve this problem, first, the exactness of detecting the received path timing must be improved and the received path timing must be detected in a low error rate.

And second, even when a receiver that can remove interference by using an interference canceler or a smart antenna (adaptive array antenna) is used, it is necessary that the received path timing is firstly detected. That is, detecting the received path timing must be executed under the surroundings in which the interference electric power is very large. Therefore, there is a problem that it is difficult to detect real received path timing under the surroundings of the interference having the large electric power.

Furthermore, a circuit and a unit for solving these problems must be simplified being suitable for small size and light weight.

SUMMARY OF THE INVENTION

It is therefore an object of the present invention to provide a received path timing detecting circuit at a cellular phone system using the DS-CDMA system, in particular, in which an initial path search and a path tracking are executed exactly with a low error rate under the surroundings having much noise and interference electric power, even at a receiver used an interference canceler and a smart antenna (adaptive array antenna).

According to a first aspect of the present invention for achieving the object mentioned above, there is provided a received path timing detecting circuit in a receiver used the DS-CDMA system. The received path timing detecting circuit provides a cross correlation coefficient calculating means for calculating cross correlation coefficients between a received signal and a reference signal in a predetermined cycle, a differential detection means that obtains real parts of products of complex conjugate numbers of respective elements of the cross correlation coefficients $\{R_{N-1,0}, R_{N-1,1}, R_{N-1,2}, \ldots, R_{N-1,M}\}$ calculated at the N−1st cycle (N is an integer) and respective elements of the cross correlation coefficients $\{R_{N,0}, R_{N,1}, R_{N,2}, \ldots, R_{N,M}\}$ calculated at the Nth cycle, and outputs the real parts as differential detection cross correlation coefficients $\{P_{N,0}, P_{N,1}, P_{N,2}, \ldots, P_{N,M}\}$, an averaging means for averaging the differential detection cross correlation coefficients outputted from the differential detection means by a predetermined time, and a peak detecting means that detects one or plural peak values from the averaged cross correlation coefficients and outputs the detected one or plural peak values as the received path timing.

According to a second aspect of the present invention, in the first aspect, the cross correlation coefficient calculating means makes a signal, which a pilot code inserted into a transmitted signal for executing coherent detection is spread by a spreading code allocated to its own receiver, the reference signal.

According to a third aspect of the present invention, in the first aspect, the averaging means applies an exponential weighting average method or a moving average method to the differential detection cross correlation coefficients by using a predetermined time constant, when the differential detection cross correlation coefficients are averaged.

According to a fourth aspect of the present invention, in the first aspect, the received path timing detecting circuit further provides a threshold value means that obtains a standard deviation of elements of the cross correlation coefficients averaged at the averaging means except the peak values, and compares a relative value among the plural peak value positions detected at the peak detecting means with a threshold value obtained by that the standard deviation is multiplied by a predetermined factor, and outputs an effective received path timing when the relative value exceeded the threshold value.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENT

Figure 1:
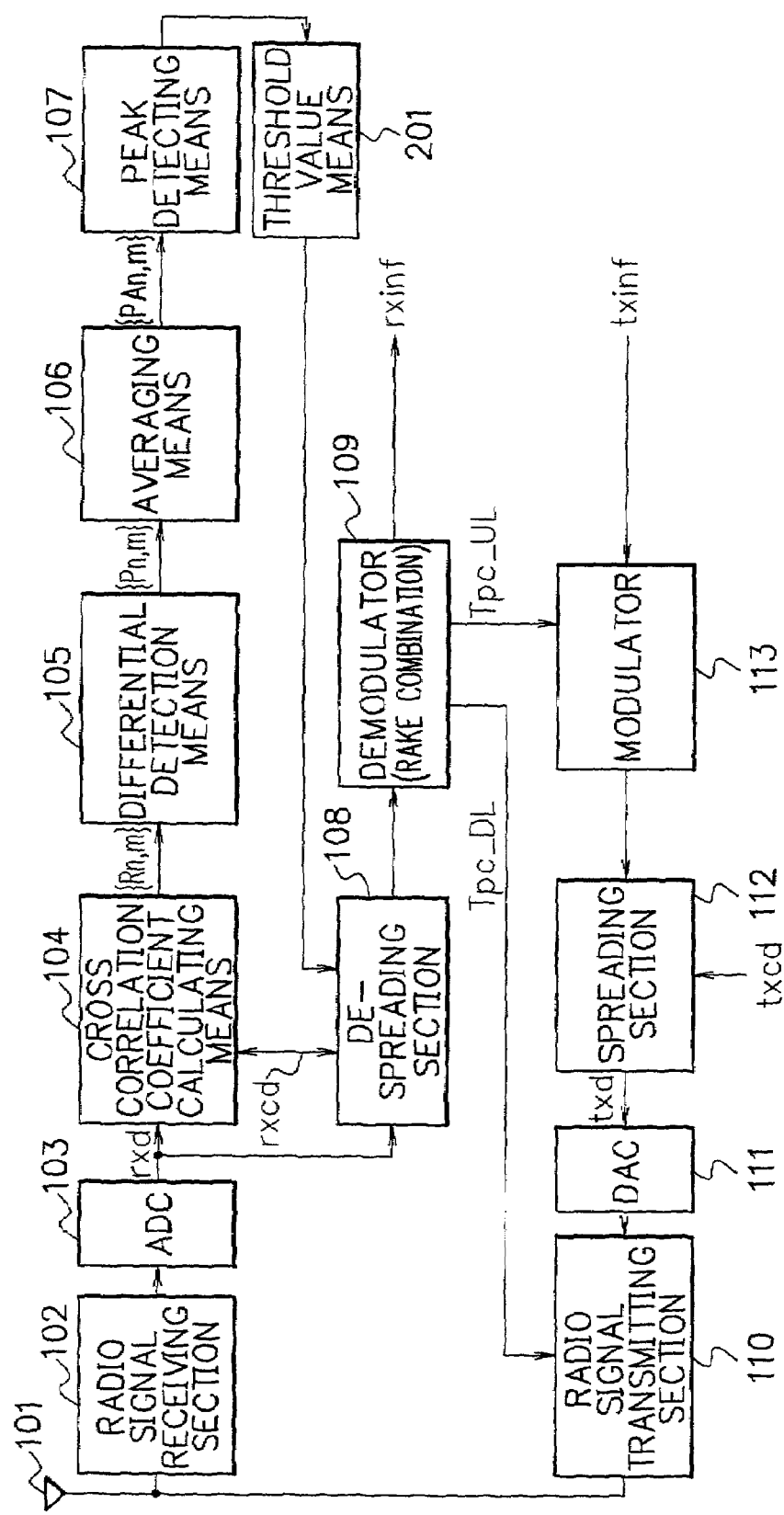
FIG. 1 is a block diagram showing an embodiment of a receiver and transmitter used a received path timing detecting circuit at a DS-CDMA system of the present invention.
Figure 2:
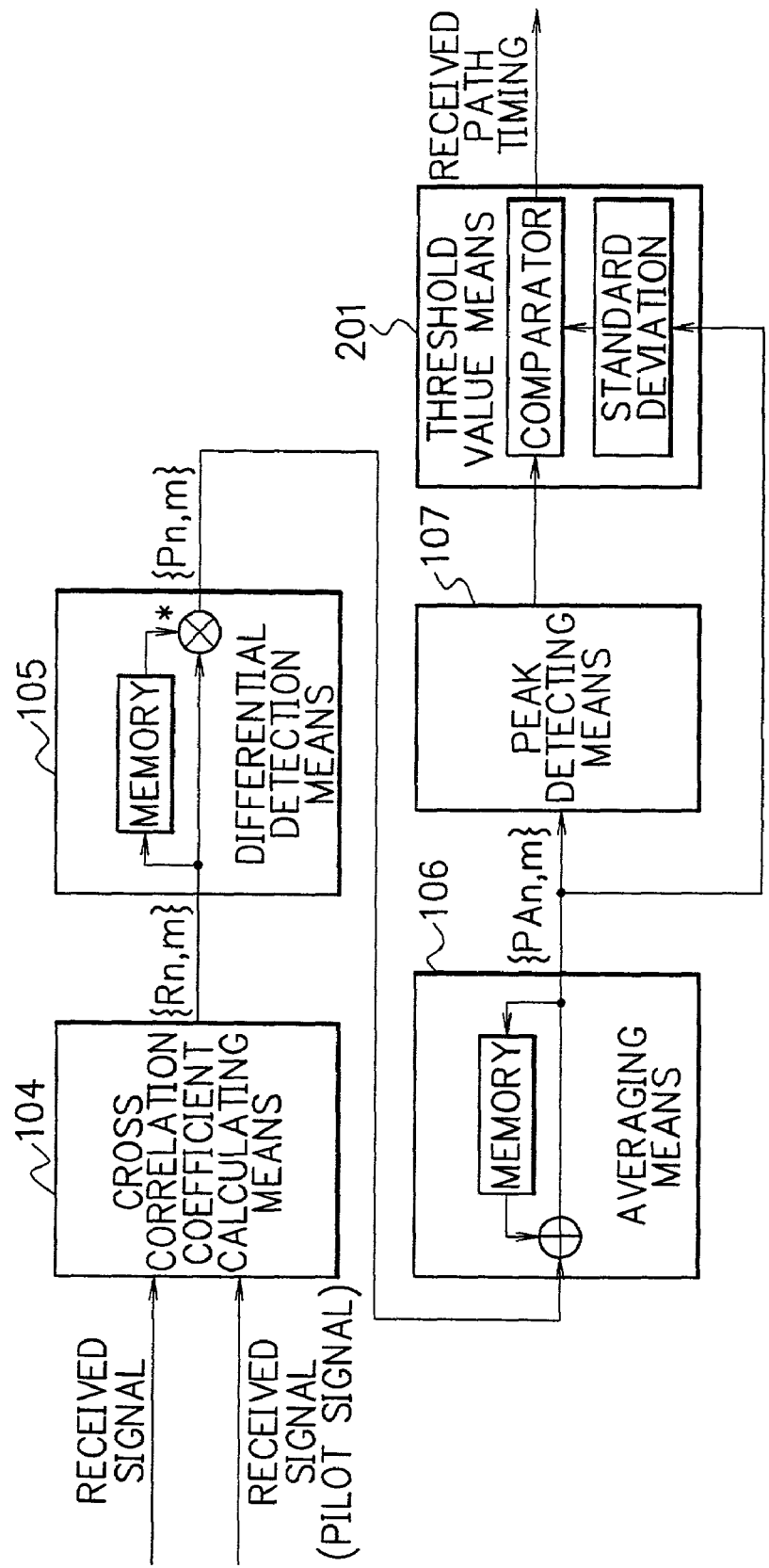
FIG. 2 is a block diagram showing an embodiment of the received path timing detecting circuit at the DS-CDMA system of the present invention.

Referring now to the drawings, an embodiment of the present invention is explained in detail. FIG. 1 is a block diagram showing an embodiment of a receiver and transmitter used a received path timing detecting circuit at the DS-CDMA system of the present invention. FIG. 2 is a block diagram showing an embodiment of the received path timing detecting circuit at the DS-CDMA system of the present invention.

Referring to FIG. 1, a received signal flow at the receiver and transmitter of the present invention is explained. At the receiver and transmitter used the DS-CDMA system, a signal received at an antenna is filtered at a radio signal receiving section 102 by a band width that is matching to a transmitted signal and its frequency is converted to a base band. After this, the signal is converted to a digital base band signal at an analog to digital converter (ADC) 103. This digital base band signal "rxd" is expressed in a complex number in which an in-phase component is a real number and an orthogonal component is an imaginary number. The digital base band signal "rxd" is inputted to a cross correlation coefficient calculating means 104 in the received path timing detecting circuit for executing an initial path search, and also is inputted to a de-spreading section 108 for applying de-spreading and demodulation to the received digital base band signal "rxd".

Next, referring to FIG. 2, the received path timing detecting circuit at the embodiment of the present invention is explained in detail. As shown in FIG. 2, the received path timing detecting circuit at the embodiment of the present invention consists of the cross correlation coefficient calculating means 104 that calculates cross correlation coefficients $\{R_{n,m}\}$ between a received signal and a reference signal in a predetermined cycle, a differential detection means 105 that multiplies each element of the cross correlation coefficients {Rn,m} outputted from the cross correlation coefficient calculating means 104 by a complex conjugate number of each element of cross correlation coefficients at the preceding one cycle and outputs differential detection cross correlation coefficients {Pn,m} being the real number parts of the multiplied result, an averaging means 106 that averages the differential detection correlation coefficients {Pn,m} in a predetermined period, and a peak detecting means 107 that detects one or plural peak values from averaged cross correlation coefficients {PAn,m} and outputs this detected peak value as received path timing. In this, the received signal, the reference signal, and the cross correlation coefficients are expressed in complex numbers being that in-phase components in the signals are real numbers, and orthogonal components in the signals are imaginary numbers.

And the received path detecting circuit at the embodiment of the present invention further provides a threshold value means 201. At a case that plural received path timing is detected, it must be avoided that a peak value caused by noise is detected by an error. In order to solve this problem, the threshold value means 201 obtains the standard deviation of the averaged cross correlation coefficients except the detected peak values, and multiplies this standard deviation by a predetermined factor and makes this multiplied value a threshold value. And the threshold value means 201 outputs only peak values exceeding the threshold value as effective received path timing.

First, the initial path search is started by that the cross correlation coefficient calculating means 104 calculates cross correlation coefficients {Rn, m} between a received signal "rxd" and a pilot signal spread by a spreading code for receiving "rxcd" of its own channel in a range of a predetermined delay time.

At the cellular system, the radius of a cell that one base station covers is decided, therefore, it is enough that the initial path search is executed in a range of the propagation delay of radio waves between the base station and a mobile terminal when the mobile terminal moves in the cell. Therefore, the delay range, in which the cross correlation coefficients are obtained, can be decided beforehand corresponding to the radius of the cell.

The differential detection means 105 obtains the real number parts {Pn,m} of the products of the cross correlation coefficients {Rn,m} and the complex conjugate numbers of cross correlation coefficients {Rn−1,m} calculated at the right before one cycle. Since much noise and many interference wave components are included in the real number parts {Pn,m} being the differential detection cross correlation coefficients by only one cross correlation operation, an exact peak value (received path timing) can not be detected, therefore, averaging must be applied to the real number parts {Pn,m} for a constant period. The averaging period at the averaging means 106 must be short enough being that it can be regarded that the received path timing hardly fluctuates, and long enough being that the influence of the noise and the interference waves can be mostly removed. At the general cellular system used the W-CDMA, it is suitable that the averaging period is about from 50 ms to 100 ms.

The averaged cross correlation coefficients {PAn,m} express a delay profile in multi path propagation channels, therefore, the received path timing at the multi path propagation channels can be detected by that the peak detecting means 107 obtains one or plural peak values of the averaged cross correlation coefficients (electric power values) {PAn, m}.

Figure 3:
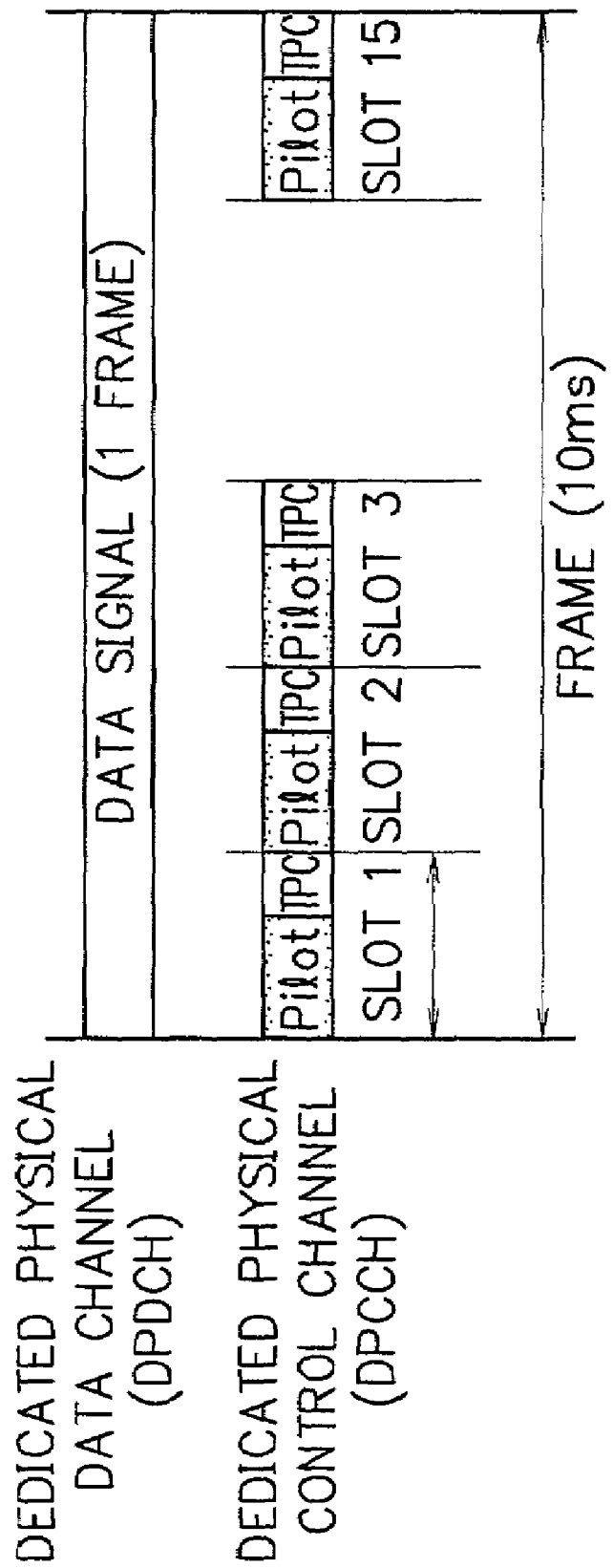
FIG. 3 is a timing chart showing a signal format at the received path timing detecting circuit at the embodiment of the present invention.

Next, referring to drawings, the operation of the received path timing detecting circuit at the embodiment of the present invention is explained in detail. FIG. 3 is a timing chart showing a signal format at the received path timing detecting circuit at the embodiment of the present invention. As shown in FIG. 3, when an uplink signal (mobile terminal to base station) at the W-CDMA system is studied as a transmitting/receiving signal, the transmitting/receiving signal consists of 15 slots being that a frame of 10 ms is divided into 15. And two signals, a data signal and a pilot signal+ control signal, are code division multiplexed in each slot. In this, for example, a transmit power control (TPC) signal is used as the control signal. The pilot signal is a predetermined code series and is used for the coherent detection and the received path timing detection of the data part.

When a received signal is defined as $\{r_t\}$ and a reference signal (pilot signal) is defined as $\{pl_t\}$, the cross correlation coefficient calculating means 104 calculates cross correlation coefficients {Rn, m} at each slot showing in an equation (1).

$$Rn, m = \Sigma_t(r_{t+m} \times pl_t^*) \quad (1)$$

In this, the slot number is "n" and the delay is "m" (m=0 to M−1), and "*" signifies a complex conjugate number.

At the cellular system, a mobile terminal transmits a signal at the timing when the mobile terminal received a signal from a base station. Therefore, it is enough that the base station searches the path timing in a range of propagation delay in which a radio wave goes to and returns from the mobile terminal in a cell area that the base station offers the service. Therefore, the delay range "M", in which the cross correlation coefficients are calculated, is the maximum propagation delay value.

The differential detection means 105 outputs only the real number parts {Pn,m} as shown in an equation (2). The real number parts {Pn, m} are the real number parts of the products of the cross correlation coefficients {Rn,m} outputted every slot and the complex conjugate numbers of cross correlation coefficients {Rn−1,m} of the previous slot (n−1 slot) that is memorized in a memory. When it is assumed that the fluctuation of the signal components (desiring wave components) among slots are small enough, only the interference components are included in the imaginary number parts, therefore, the imaginary number parts can be discarded.

$$Pn, m = \text{real} (Rn,m \times Rn-1,m^*) \quad (2)$$

The averaging means 106 obtains the average value of the cross correlation coefficients {Pn, m} differentially detected in the N slots at the differential detection means 105. That is, the average value {PAn,m} is obtained at the following equation (3).

$$PAn,m = \Sigma_n(Pn,m)/N \quad (3)$$

At the case that the average value is obtained every N slots, first, the memory in the averaging means 106 is cleared, and after this, the cross correlation coefficients {Pn,m} differentially detected in the N slots are added. And at the peak detecting means 107, only a relative value of the cross correlation coefficients is used, therefore, it is not necessary that the cross correlation coefficients are divided by the number of slots N. Therefore, at an actual apparatus, the cross correlation coefficients are not divided by N, and it is enough that the accumulated value is outputted as it is, that is, the peak detecting means 107 outputs a signal showing at an equation (4)

$$PAn,m=\Sigma_n(Pn,m) \tag{4}$$

At the averaging method mentioned above, the averaged result is outputted at only once in the N slots, therefore the delay of N slots occurs for detecting the received path timing in the average. In order to make this delay short and not to decrease the number of slots being equivalent to using for averaging, a moving average method or an exponential weighting average method can be used.

At the moving average method, differentially detected cross correlation coefficients $\{Pn,m\}$ of N slots in the past are made to memorize in a memory, and the accumulated cross correlation coefficients $\{Pn,m\}$ of the N slots are outputted at the timing executing the peak value detection. The peak value detection can be executed at an arbitrary slot interval. When the peak value detection is executed at every slot, the detection delay of the received path timing is reduced by half being N/2 slots in the average. However, the amount of data to be memorized and calculated increases largely.

At the exponential weighting average method, it is possible that the detecting interval is made to be short under that the amount of data to be memorized and calculated is kept in a certain amount. When a forgetting factor is defined as $\lambda$, the averaged cross correlation coefficient $\{PAn,m\}$ is shown in an equation (5).

$$PAn,m=\lambda PAn-1,m+(1-\lambda)Pn,m \tag{5}$$

At the peak detecting means 107, the maximum value of the averaged cross correlation coefficient $\{PAn,m\}$ is obtained and the delay at this time is made to be the received path timing. When the propagation channel is a multi path propagation channel and a RAKE combination receiving is executed, plural peak values must be detected. Side lobes generated by the characteristic of a transmitting/receiving filter exist before and after the peak value. Therefore, the side lobes are removed and a next large cross correlation value is found, and the delay of this next large cross correlation value is made to be the received path timing of the second. This operation is repeated for all of the paths.

At a conventional received path timing detecting circuit, the electric power of cross correlation coefficients is obtained, and this plural electric power is averaged in plural times, and after this, the peak value is detected. That is, when the number of averaging times is defined to be N, averaged cross correlation coefficients $\{PA'n,m\}$ at the conventional received path detecting circuit is shown in an equation (6).

$$PA'n,m=\Sigma_n|Rn,m|^2/N \tag{6}$$

At the received path timing detecting circuit of the present invention, the real number parts, which are the products of the cross correlation coefficients and the complex conjugate numbers of the cross correlation coefficients at the preceding one cycle, are obtained. Therefore, $$PAn,m=\Sigma_n\text{real}\ (Rn,m\times Rn-1,m^*)/N \tag{7}$$

In this, * signifies the complex conjugate number.

The cross correlation coefficients $\{Rn,m\}$ include signal components that are desired to receive (desiring wave components), and noise and interference wave components that are not desired to receive (not desiring signal components). When the desiring wave components are defined as $Sn,m$ and the not desiring signal components are defined as $Nn,m$, the $Rn,m$ is shown, $$Rn,m=Sn,m+Nn,m,$$

and $$PA'n,m=\Sigma_n|Sn,m+Nn,m|^2/N=\Sigma_n(|Sn,m|^2+|Nn,m|^2+Sn,m\ Nn,m^*+Sn,m\ Nn,m^*)/N \tag{8}$$

In this, since the relation between the signal components and the noise+interference wave components is non correlation, when the number of averaging times is sufficiently large, $$\Sigma_n(Sn,m\ Nn,m^*+Sn,m\ Nn,m^*)/N\to 0$$

is regarded, therefore, $$PA'n,m\to\Sigma_n(|Sn,m|^2+|Nn,m|^2)/N \tag{9}$$

Therefore, even though the number of the averaging times is increased, the electric power of the noise and the interference wave components is added and remains.

At the present invention, $$PAn,m=\Sigma_n\ \text{real}\ ((Sn,m+Nn,m)\times(Sn-1,m+Nn-1,m)^*)/N=\Sigma_n\text{real}\ (Sn,m\ Sn-1,m^*+Nn,m\ Nn-1,m^*+Sn,m\ Nn-1,m^*+Nn,m\ Sn-1,m^*)/N \tag{10}$$

In this, the relation between the signal components and the noise+interference wave components is non-correlation, at the same time, the time shifted noise components are not correlated with each other and also the time shifted interference wave components are not correlated with each other. Different spreading code series are used at then n−1th cycle and the n th cycle, and it can be regarded that there is non-correlation between them. To be exact, when a spreading code being longer cycle than a cycle for obtaining a cross correlation coefficient is used, part series at adjacent cross correlation coefficient regions become different. Therefore, it can be regarded that the interference wave components are not correlated. Consequently, it can be regarded that the terms except the first term of the equation (10) is "0", when the number of averaging times is sufficiently large.

Furthermore, phases and amplitudes of the signal components are fluctuated in its time passage but are not changed largely in the adjacent cycles, that is, it can be regarded that the correlation $\approx 1$. Therefore, $$PAn,m\to\Sigma_{n\ real}\ (Sn,m\ Sn-1,m^*)/N\to\Sigma_n|Sn,m|^2/N \tag{11}$$

And it is understandable that the influence of the noise+interference wave components do not remain when the number of averaging times is sufficiently large at the present invention.

Therefore, at a case that a receiver used an interference canceler and a smart antenna (adaptive array antenna) detects an initial path timing under a state in which the interference electric power is very large, the receiver can remove the influence caused by the interference waves by making the averaging time long, and can detect exact initial path timing.

Next, the other parts of the transmitter and receiver used the DS-CDMA system shown in FIG. 1 at the embodiment of the present invention is explained. The de-spreading section 108 applies de-spreading to the received signal "rxd" by using one or plural received path timing obtained above and a spreading code for receiving "rxcd" allocated to its own channel. A demodulator 109 detects received information "rxinf" by applying coherent detection to the received signal applied the de-spreading by using, for example, a pilot signal as the reference signal. At the case of the multi path propagation channels, the demodulator 109 also executes the RAKE combination that combines signals applied the de-spreading and the coherent detection at every multi paths in the maximum ratio.

At the case that transmitting electric power control, which is indispensable at the DS-CDMA system, is executed, it is necessary that the demodulator 109 estimates a signal to interference electric power ratio (SIR) of the received signal and compares the estimated SIR with a target SIR that is needed to achieve predetermined receiving quality, and calculates an uplink transmitting electric power control command Tpc_UL that makes transmitting electric power to a destination (mobile terminal) increase or decrease. And also the demodulator 109 has a function to demodulate a downlink transmitting electric power control command Tpc_DL transmitted from the mobile terminal, in order to control transmitting electric power of its own base station.

This transmitting electric power control is indispensable at the DS-CDMA system, however, this technology is an existing technology that does not directly relate to the received path timing detecting circuit of the present invention. Therefore, the detailed explanation is omitted.

Signal transmitting part of the transmitter and receiver shown in FIG. 1 consists of a modulator 113, a spreading section 112, a digital to analog converter (DAC) 111, and a radio signal transmitting section 110. Transmitting information "txinf" and the Tpc_UL being the uplink transmitting electric power control command are multiplexed at the modulator 113, and are modulated by, for example, a quadrature phase shift keying (QPSK), and after this, are spread by a spreading code for transmitting "txcd" at the spreading section 112.

The spread transmitting signal "txd" is converted to an analog signal at the DAC 111. After this, the band of the analog signal is limited by a roll off filter, and the frequency of the analog signal is converted to a radio frequency, and the analog signal is amplified at the radio signal transmitting section 110. After this, the analog signal is transmitted by the antenna 101. The transmitting electric power is increased or decreased by the command of the Tpc_DL.

This signal transmitting part does not directly relate to the received path timing detecting circuit of the present invention and can be executed by using an existing technology. Therefore, the detailed explanation is omitted.

As mentioned above, according to the present invention, when a delay profile (cross correlation coefficients) is averaged, the electric power of noise and interference wave is not added, therefore, the detecting exactness of the received path timing can be improved and the received path timing can be detected without having errors.

Moreover, according to the present invention, at a system using an interference canceler or a smart antenna (adaptive array antenna), even at an initial state, in which interference electric power is large, the received path timing can be detected.

While the present invention has been described with reference to the particular illustrative embodiment, it is not to be restricted by that embodiment but only by the appended claims. It is to be appreciated that those skilled in the art can change or modify the embodiment without departing from the scope and spirit of the present invention.

What is claimed is:

1. A received path timing detecting circuit in a receiver used in a direct spread—code division multiple access (DS-CDMA) system, comprising:
    a cross correlation coefficient calculator for calculating cross correlation coefficients between a received electromagnetic signal and a reference electromagnetic signal in a predetermined cycle;
    a differential detector that obtains real parts of products of complex conjugate numbers of respective elements of said cross correlation coefficients $\{R_{N-1,0}, R_{N-1,1}, R_{N-1,2}, \ldots R_{N-1,M}\}$ calculated at the N–1st cycle (N is an integer) and respective elements of said cross correlation coefficients $\{R_{N,0}, R_{N,1}, R_{N,2}, \ldots R_{N,M}\}$ calculated at the Nth cycle, and outputs said real parts as differential detection cross correlation coefficients $\{P_{N,0}, P_{N,1}, P_{N,2}, \ldots, P_{N,M}\}$;
    an averager for averaging said differential detection cross correlation coefficients outputted from said differential detection means by a predetermined time; and
    a peak detector that detects one or plural peak values from said averaged cross correlation coefficients and outputs said detected one or plural peak values as said received path timing.

2. A received path timing detecting circuit in accordance with claim 1, wherein:
    said reference signal is a transmitted signal with an inserted pilot code for executing coherent detection, and wherein said transmitted signal is spread by a spreading code allocated to a predetermined receiver.

3. A received path timing detecting circuit in accordance with claim 1, wherein:
    said averager applies an exponential weighting average or a moving average to said differential detection cross correlation coefficients by using a predetermined time constant, when said differential detection cross correlation coefficients are averaged.

4. A received path timing detecting circuit in accordance with claim 1, further comprising:
    a threshold valuator that obtains a standard deviation of elements of said cross correlation coefficients averaged at said averager except said peak values, and compares a relative value among said plural peak value positions detected at said peak detetctor with a threshold value obtained by said standard deviation multiplied by a predetermined factor, and outputs an effective received path timing when said relative value exceeded said threshold value.

* * * * *

UNITED STATES PATENT AND TRADEMARK OFFICE
CERTIFICATE OF CORRECTION

PATENT NO. : 7,142,587 B2 Page 1 of 1
APPLICATION NO. : 09/875151
DATED : November 28, 2006
INVENTOR(S) : Toshifumi Sato It is certified that error appears in the above-identified patent and that said Letters Patent is hereby corrected as shown below:

Column 1, line 65, delete "At" and insert --$\Delta$t--.

Signed and Sealed this

Sixth Day of March, 2007

JON W. DUDAS
*Director of the United States Patent and Trademark Office*